US012695642B2

(12) United States Patent
Karunanidhi et al.

(10) Patent No.: US 12,695,642 B2
(45) Date of Patent: Jul. 28, 2026

(54) FAST RECOVERY IN LAYER 2 RINGS USING SELECTIVE REPLICATION

(71) Applicant: Cisco Technology, Inc., San Jose, CA (US)

(72) Inventors: Saravanan M Karunanidhi, Bangalore (IN); Sonal Shah, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 296 days.

(21) Appl. No.: 18/628,877

(22) Filed: Apr. 8, 2024

(65) Prior Publication Data

US 2025/0317325 A1 Oct. 9, 2025

(51) Int. Cl.
*H04L 12/437* (2006.01)
*H04L 45/24* (2022.01)
*H04L 45/745* (2022.01)

(52) U.S. Cl.
CPC ............ *H04L 12/437* (2013.01); *H04L 45/24* (2013.01); *H04L 45/745* (2013.01)

(58) Field of Classification Search
CPC .......... H04L 5/745; H04L 5/24; H04L 12/437
USPC ........................................................ 370/223
See application file for complete search history.

(56) References Cited

U.S. PATENT DOCUMENTS

| | | | |
|---|---|---|---|
| 2004/0081083 A1 | 4/2004 | Sekihata | |
| 2008/0095047 A1* | 4/2008 | Skalecki | H04L 41/0668 370/225 |
| 2010/0238813 A1* | 9/2010 | Allan | H04L 12/465 370/252 |
| 2013/0003530 A1 | 1/2013 | Davari | |
| 2013/0064075 A1 | 3/2013 | Pu | |
| 2016/0191545 A1* | 6/2016 | Nanda | H04L 43/20 726/1 |
| 2017/0180153 A1 | 6/2017 | Subramaniam et al. | |
| 2020/0045149 A1 | 2/2020 | Maeda et al. | |

FOREIGN PATENT DOCUMENTS

TW          I875487 B   *   3/2025

* cited by examiner

*Primary Examiner* — Peter G Solinsky
(74) *Attorney, Agent, or Firm* — Lee & Hayes, P.C.

(57) ABSTRACT

In one embodiment, fast recovery in layer 2 rings using selective replication is disclosed. A method includes configuring, at a ring node of a network ring, a lookup table of the ring node to point to both a first ring port and a second ring port of the ring node for remote addresses learned on either the first ring port or the second ring port and configuring, at the ring node, the lookup table to point to a corresponding non-ring port of the ring node for local addresses learned on that corresponding non-ring port. The method further includes receiving, at the ring node, a packet having a destination address and sending, by the ring node, the packet toward the destination address according to the lookup table, thereby replicating the packet, when received on a non-ring port of the ring node and destined to a remote address, onto both the first ring port and the second ring port.

20 Claims, 5 Drawing Sheets

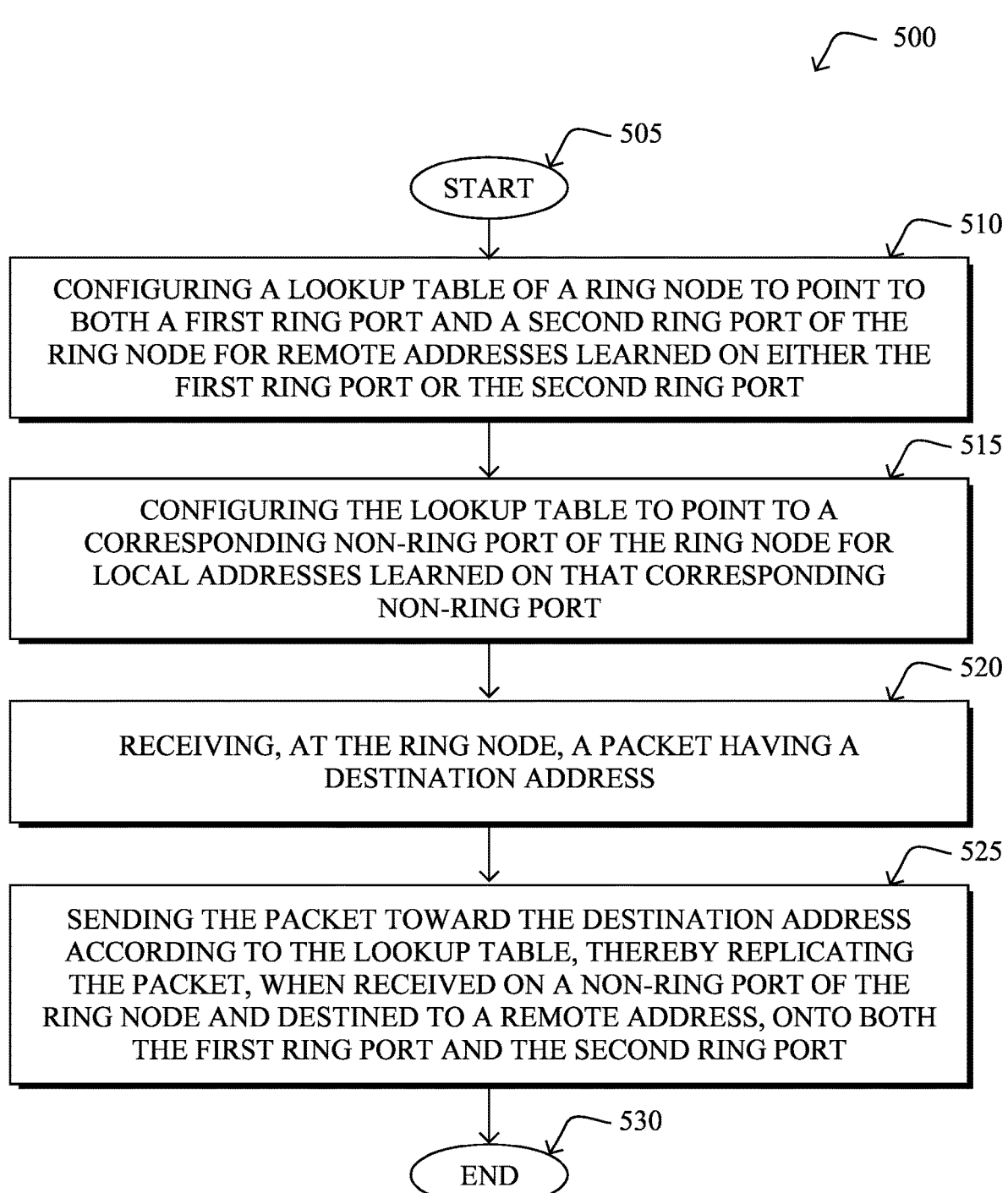

500

505

START

510

CONFIGURING A LOOKUP TABLE OF A RING NODE TO POINT TO BOTH A FIRST RING PORT AND A SECOND RING PORT OF THE RING NODE FOR REMOTE ADDRESSES LEARNED ON EITHER THE FIRST RING PORT OR THE SECOND RING PORT

515

CONFIGURING THE LOOKUP TABLE TO POINT TO A CORRESPONDING NON-RING PORT OF THE RING NODE FOR LOCAL ADDRESSES LEARNED ON THAT CORRESPONDING NON-RING PORT

520

RECEIVING, AT THE RING NODE, A PACKET HAVING A DESTINATION ADDRESS

525

SENDING THE PACKET TOWARD THE DESTINATION ADDRESS ACCORDING TO THE LOOKUP TABLE, THEREBY REPLICATING THE PACKET, WHEN RECEIVED ON A NON-RING PORT OF THE RING NODE AND DESTINED TO A REMOTE ADDRESS, ONTO BOTH THE FIRST RING PORT AND THE SECOND RING PORT

530

END

FIG. 5

FAST RECOVERY IN LAYER 2 RINGS USING SELECTIVE REPLICATION

TECHNICAL FIELD

The present disclosure relates generally to computer networks, and, more particularly, to fast recovery in layer 2 rings using selective replication.

BACKGROUND

State of the art industrial network deployments require stringent network resiliency in case of link/device failures. In industrial networks where zero packet loss is expected, complete network redundancy is provided using Parallel Redundancy Protocol (PRP) or High-Availability Seamless Redundancy (HSR). PRP uses a different scheme, where the end nodes implement redundancy (instead of network elements) by connecting two network interfaces to two independent, disjointed, parallel networks (LAN-A and LAN-B). Each of these Dually Attached Nodes (DANs) then have redundant paths to all other DANs in the network. HSR is similar to Parallel Redundancy Protocol (PRP) but is designed to work in a ring topology. Instead of two parallel independent networks of any topology (LAN-A and LAN-B), HSR defines a ring with traffic in opposite directions. Port-A sends traffic counter-clockwise in the ring, and Port-B sends traffic clockwise in the ring.

To allow the switch to determine and discard duplicate packets, additional protocol specific information is sent with the data frame. For PRP, this is sent as part of a trailer called the redundancy control trailer (RCT), whereas for HSR this is sent as part of the header called the HSR header. Both the RCT and HSR header contain a sequence number, which is the primary data used to determine if the received frame is the first instance or a duplicate instance.

Notably, these technologies generally require additional hardware capabilities that increase the cost of hardware as well as redundant deployment topologies. These approaches may also add additional complexity in the end host by adding dual attachment points.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 5 illustrates an example procedure for fast recovery in layer 2 rings using selective replication in accordance with the present disclosure.

DESCRIPTION OF EXAMPLE EMBODIMENTS

Overview

According to one or more implementations of the disclosure, a method includes configuring, at a ring node of a network ring, a lookup table of the ring node to point to both a first ring port and a second ring port of the ring node for remote addresses learned on either the first ring port or the second ring port and configuring, at the ring node, the lookup table to point to a corresponding non-ring port of the ring node for local addresses learned on that corresponding non-ring port. The method further includes receiving, at the ring node, a packet having a destination address and sending, by the ring node, the packet toward the destination address according to the lookup table, thereby replicating the packet, when received on a non-ring port of the ring node and destined to a remote address, onto both the first ring port and the second ring port.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computing system.
Figure 1:
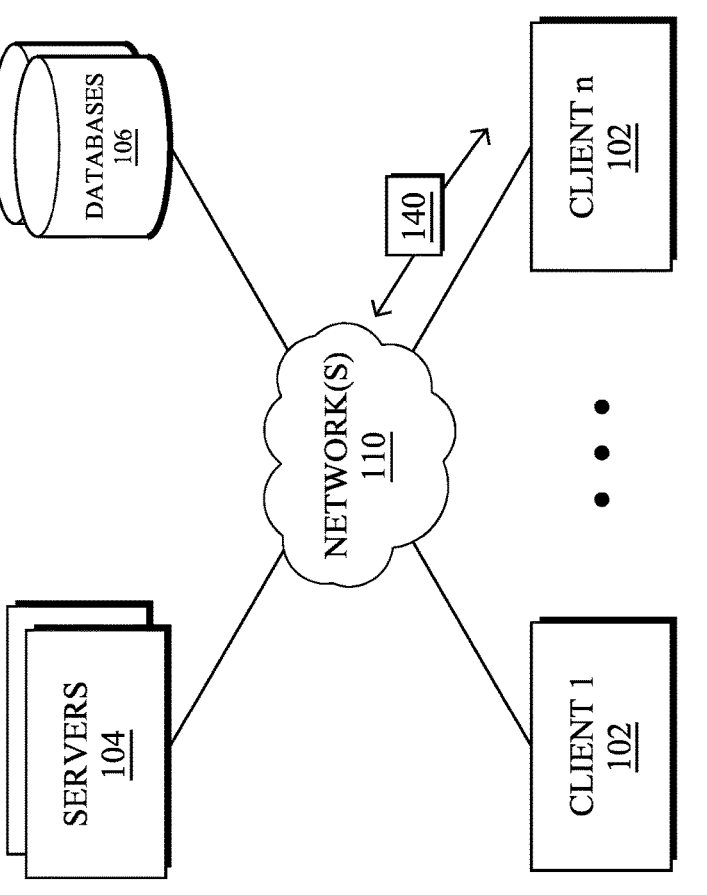

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
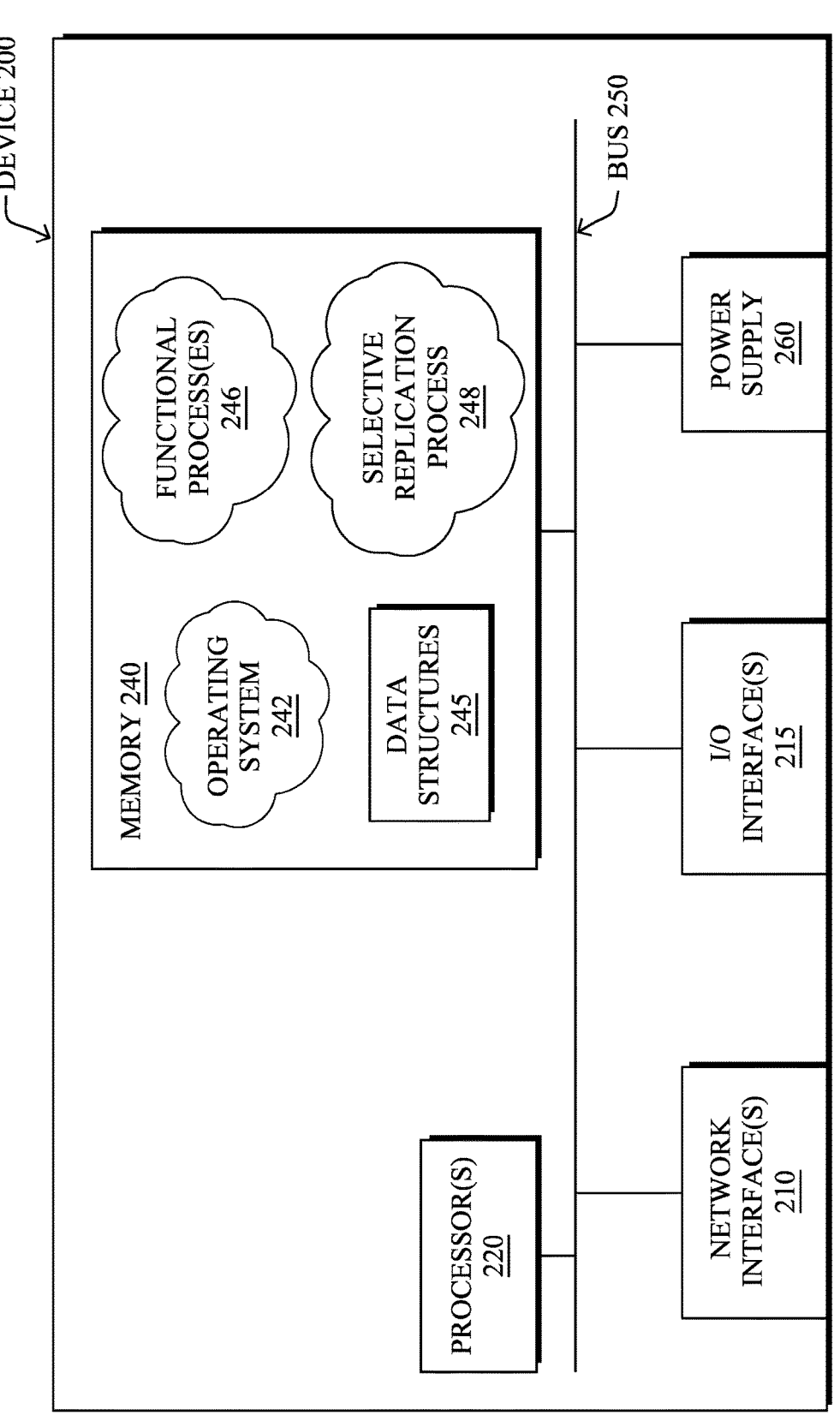
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a selective replication process (selective replication process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, the selective replication process 248 may include computer executable instructions that, when executed by processor(s) 220, cause device 200 to perform the techniques described herein.

To do so, in some implementations, selective replication process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, selective replication process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that selective replication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, selective replication process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, selective replication process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, selective replication process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

As noted above, network deployments and, particularly, industrial network deployments require stringent network resiliency in case of link and/or device failures. In order to provide this resiliency, in industrial networks where zero packet loss is expected, complete network redundancy may be provided using Parallel Redundancy Protocol (PRP) or High-Availability Seamless Redundancy (HSR). However, as also noted above, these technologies generally require additional hardware capabilities that increase the cost of hardware as well as redundant deployment topologies. These approaches may also add additional complexity in the end host by adding dual attachment points.

—Fast Recovery in Layer 2 Rings Using Selective Replication—

The techniques herein leverage layer 2 (or "L2") ethernet rings (referred to herein in the alternative as "network rings," and/or "ring networks"), which can provide optimal redundancy without the need for the additional complexities of the approaches described above. For example, the techniques described herein may merely require basic switch functionality such as learning, flooding, and/or direct MAC destination forwarding to achieve the functionality of the implementations described herein.

As mentioned above, industrial network deployments require stringent network resiliency in case of link and/or device failures. In industrial networks where zero packet loss is expected, complete network redundancy is generally provided using Parallel Redundancy Protocol (PRP) or High-Availability Seamless Redundancy (HSR). PRP uses a scheme where the end nodes implement redundancy (instead of network elements) by connecting two network interfaces to two independent, disjointed, parallel networks (LAN-A and LAN-B). Each of these Dually Attached Nodes (DANs) then have redundant paths to all other DANs in the network.

HSR is similar to Parallel Redundancy Protocol (PRP) but is designed to work in a ring topology. Instead of two parallel independent networks of any topology (LAN-A and LAN-B), HSR defines a ring with traffic in opposite directions. Port-A sends traffic counter-clockwise in the ring, and Port-B sends traffic clockwise in the ring. To allow the switch to determine and discard duplicate packets, additional protocol specific information is sent with the data frame. For PRP, this is sent as part of a trailer called the redundancy control trailer (RCT), whereas for HSR this is sent as part of the header called the HSR header. Both the RCT and HSR header contain a sequence number, which is the primary data used to determine if the received frame is the first instance or a duplicate instance. These methods simply add cost and complexity in the end host as well as the network elements to provide redundancy network path as well as hardware cost to add additional header, duplicate the packet and in the end host/network to discard the duplicates.

Another alternative where industrial networks are tolerant up to several milliseconds use layer 2 ethernet rings without additional complexity of replication/discard support in hardware and avoids the complexity of building redundancy into hosts/networks. However, the time taken to converge after a link failure or a device/switch failure in the ring is not zero and it varies based on various factors. The ethernet ring builds in optimal redundancy but to avoid loop, one of the ports is kept in a blocked mode. When there is link failure in the ring, the convergence time is dependent upon ability to detect failure, communicate the failure to all the switches in the ring, move the blocked port to forward and purge media access control (MAC) addresses in all the switches in the ring. All these actions take time and the current convergence time being that is practically achieved in current Industrial Ethernet switches vary in the range of thirsty to sixty milliseconds. In contrast and as described in more detail herein, implementations of the present disclosure provide a mechanism to achieve convergence below five milliseconds, such as three milliseconds, because the convergence can be defined as only function of ability to detect link failure. It is noted that these specific numerical values are merely provided to elucidate aspects of the disclosure and, in practice, other convergence times may be observed in accordance with the disclosure. That is, because the convergence time can be dependent on the capabilities of processing units in the systems described herein, the convergence times may vary based on these processor capabilities. However, aspects of the present disclosure provide a mechanism to reduce the convergence time to a constant value, i.e., the time taken to flip a bit to change from a blocked port to a forwarding port. It will therefore be appreciated that implementations of the present disclosure allow for a reduction in the convergence time as compared to current approaches.

Further, some approaches to providing redundancy in the form of faster convergence in the case of a link and/or device failure using ethernet rings rely on application-specific integrated circuit (ASIC) or other hardware techniques to provide convergence on the order of ten milliseconds to twenty milliseconds. In contrast, implementations described herein seek to utilize standard switching functionality of switching ASICs (e.g., internal and external switching ASICs used in industrial switches) to improve convergence time (e.g., to provide convergence times that are lower than ten milliseconds such as five milliseconds or three milliseconds) without the need for additional ASICs and/or hardware relied on by other approaches. As described in more detail herein, one technique that allows for implementations of the present disclosure to be realized includes selective replication along the ethernet ring.

Specifically, according to one or more embodiments of the disclosure as described in detail below, a method includes configuring, at a ring node of a network ring, a lookup table of the ring node to point to both a first ring port and a second ring port of the ring node for remote addresses learned on either the first ring port or the second ring port and configuring, at the ring node, the lookup table to point to a corresponding non-ring port of the ring node for local addresses learned on that corresponding non-ring port. The method further includes receiving, at the ring node, a packet having a destination address and sending, by the ring node, the packet toward the destination address according to the lookup table, thereby replicating the packet, when received on a non-ring port of the ring node and destined to a remote address, onto both the first ring port and the second ring port.

Illustratively, the techniques described herein may be performed by hardware, software, and/or firmware, such as in accordance with the selective replication process 248, which may include computer executable instructions executed by the processor(s) 220 (or independent processor of network interfaces 210) to perform functions relating to the techniques described herein, e.g., in conjunction with routing process 244.

Figure 3:
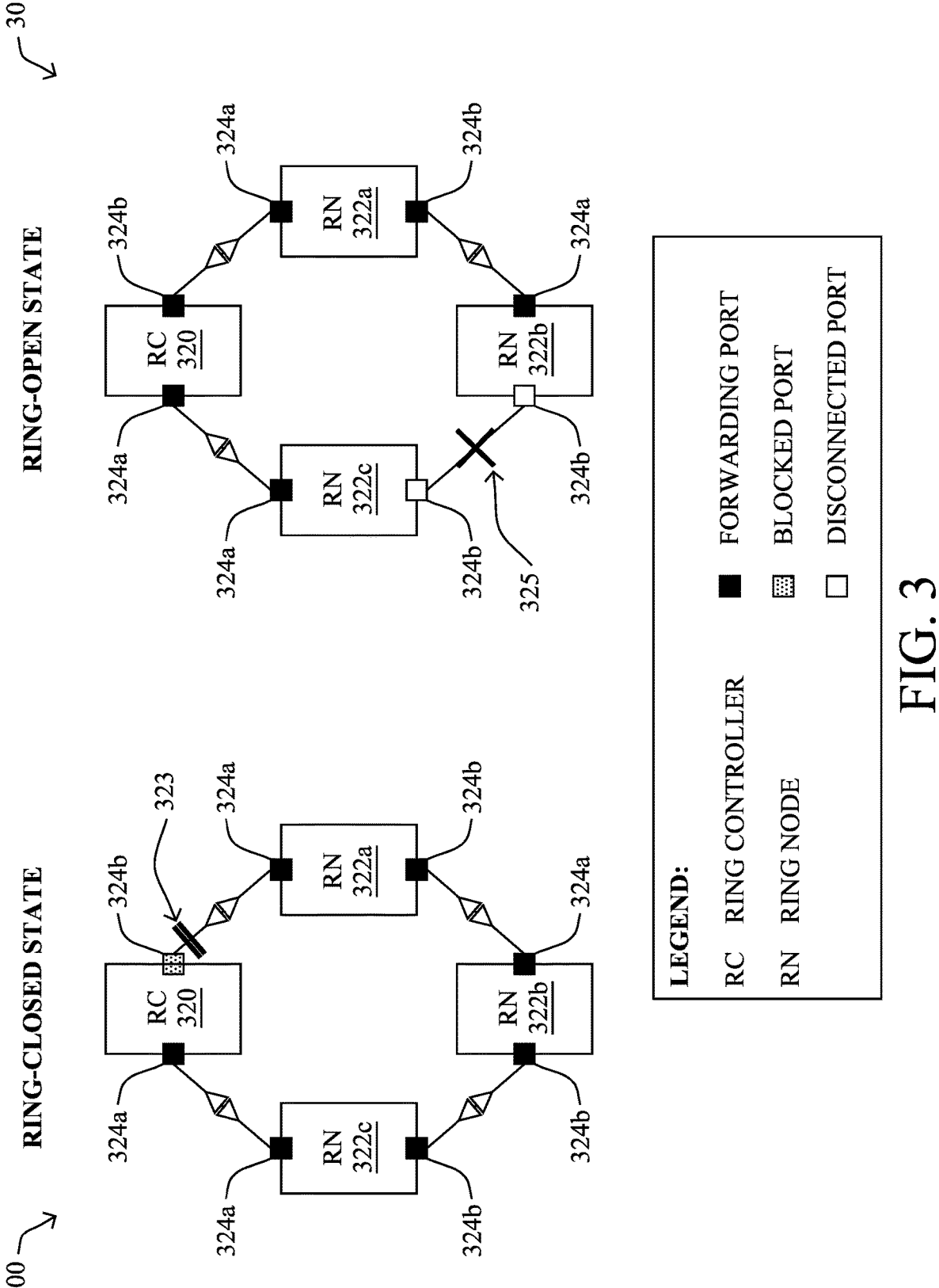
FIG. 3 illustrates an example of an ethernet ring in a ring-closed state and in a ring-open state.

Operationally, FIG. 3 illustrates an example of an ethernet ring in a ring-closed state (on the left) and in a ring-open state (on the right). As shown in FIG. 3, the ethernet ring having a ring-closed state (e.g., the ring-closed state ethernet ring 300) includes a ring controller 320 and a plurality of ring nodes, such as a first ring node 322a, a second ring node

322b, and a third ring node 322c. Similarly, the ethernet ring having a ring-open state (e.g., the ring-open state ethernet ring 301) includes a ring controller 320 and a plurality of ring nodes, such as a first ring node 322a, a second ring node 322b, and a third ring node 322c.

Each of the ring nodes can have one or more ports, as shown in FIG. 3. For example, the first ring node 322a can have a first ring port 324a and a second ring port 324b. Similarly, second ring node 322b can have a first ring port 324a and a second ring port 324b, and the third ring node 322c can have a first ring port 324a and a second ring port 324b. In addition, as shown in FIG. 3, the ring controller 320 can have a first ring port 324a and a second ring port 324b.

The ports can be forwarding ports, blocked ports, or disconnected ports, as shown in FIG. 3. For example, the first ring port 324a associated with the first ring node 322a of the ring-closed state ethernet ring 300 can be a forwarding port, as indicated by said being indicated as a dark box. Continuing with this example, the second ring port 324b associated with the ring controller 320 the ring-closed state ethernet ring 300 can be a blocked port, as indicated by the hashing in this box. Further, as shown in FIG. 3, the disconnected ports, such as the second ring port 324b associated with the second ring node 322b of the ring-open state ethernet ring 301 can be a disconnected port, as indicated by the lack of fill in the box.

Continuing with the non-limiting example of FIG. 3, the blocked port (e.g., the second ring port 324b associated with the ring controller 320 the ring-closed state ethernet ring 300) can neither accept packets nor transmit packets, as indicated at operation 323. Similarly packet transmission can be blocked between the second ring port 324b associated with the second ring node 322b and the second ring port 324b associated with the third ring node 322c of the ring-open state ethernet ring 301 as indicated at operation 325.

As mentioned above, implementations of the present disclosure not only provide faster convergence in ethernet rings where zero redundancy is not expected, but also provide faster convergence than the approaches described above with respect to layer 2 ethernet rings (and other such ethernet rings). In addition, implementations herein can solve the so-called "convergence problem," particularly in layer 2 ethernet rings by utilizing selective replication techniques on multiple the ring ports while still using standard layer 2 look-up and/or flood capacity available on existing switches. Accordingly, implementations described herein generally do not require any changes to packets by the way of headers and/or trailers, and/or generally do not require building redundancy into a network and/or a host, as is common in some approaches.

Further, implementations described herein can be added to any ethernet ring protocols that are prevalent currently (e.g., REP, MRP, etc.), as well as any future protocol that may be developed. That is, because the implementations described herein require few, if any changes to standardized ethernet ring layouts and protocols and, as discussed above, tend to reduce complexities associated with adding additional components that some approaches favor. For example, implementations described herein can be added as addon extension(s) to existing protocols with minor changes as the implementations herein do not alter general handling of MAC addresses and therefore do not alter MAC learning techniques within the ethernet ring and/or do not require modifications to how the basic switching of data traffic works in the ethernet ring.

As shown in FIG. 3, one switch the in the ring is designated as the ring controller 320 at ring initialization.

The ring controller 320 of the ring-closed state ethernet ring 300 can mark one of its ports (in this case the second ring port 324b of the ring controller 320) as being logically blocked. As shown in FIG. 3 all the other ports of the ring-closed state ethernet ring 300 are designated as forwarding ports. This may ensure that the is no logical loop in the ring and that connectivity is maintained between any two switches associated with the ring.

In some approaches, link failure detection can be achieved using one or more fast link detection schemes. For example, current industrial switches use beacons sent from the ring controller 320 towards the ring and expected to receive the beacon back on the other controller port. In general, if there are continuous 3 failures to receive beacon back in controller, the ring controller 320 detects that there is at least one logical link break in the ring. When the ring controller 320 sees a link failure, it may open its blocked port to forwarding and may send a multicast message indicating a topology change to all the nodes in the ring. This topology change is generally hardware forwarded and a copy is sent to a central processing unit (CPU) for the recovery action on each node to be done in the software. In general, all the nodes in the ring that receive this topology change purge their MAC address where the destination is either one of the ring ports. When the link failure occurs, it is recommended either one of the nodes near the failure take the controller functionality and continue sending beacons for further monitoring of the link status in the ring.

When a ring failure occurs, the following actions may be performed for recovery. These actions will be referred to herein as "step one," "step two," step three," and "step four," or collectively as "steps 1-4."

1. Detect the link failure and/or the device failure in the ring;
2. Move the alternate/blocked port to forwarding state so that the connectivity can be restored;
3. Communicate the failure to all switches in the ring using topology change notification; and
4. Purge the MAC address where the destination is either one of the ring ports.

Performing these operations can ensure that the traffic is not forwarded along the wrong path and that there is no black-holing of traffic in the ring. Out of these four steps detecting link failure (step one) can be done in constant time (e.g., periodically) as a function of beacon interval sent across the ring. With some current CPU/Microcontroller capabilities, sending a one millisecond beacon across the ring is feasible and may improve over the time as the CPU/MCU processing capacity advances. As a result, this step of detecting link failure using a beacon cab be done in around three milliseconds or lower for three consecutive beacon failures.

Steps three and four can be performed in software control and can therefore add additional latency to the process. In order to mitigate this latency, some approaches may include specialized hardware, ASICs, and/or field-programmable gate arrays (FPGAs) to support steps three and four in hardware. As mentioned above, however, this can complicate the system and can add additional costs.

In general, step three can require the ring controller to generate the topology change notification if it is done in software, which can add significant latency. Step four requires purging specific section of MAC addresses in L2 tables where the ring ports are the destination. This is not typically easy to implement in switching ASICs and requires purging entire MAC table or purging the MACs learnt on specific VLAN. Faster purging may include invalidating entire MAC table, though that would affect other hosts. The purge operation of MAC addresses may vary as per switching ASIC capabilities and may require spanning across all the VLANs in the ring port. In addition, the purge operation of MAC addresses could be affected by the scale of the MAC address.

In order to address these and other deficiencies, implementations of the present disclosure provide for a methodology to eliminate the latency caused by steps three and four. In accordance with the disclosure, the packets are replicated on either side of the ring in each ring node (e.g., in the ring controller 320 the first ring node 322a, the second ring node 322b, and the third ring node 322c, etc.) unless the packet is destined to a non-ring port. In some implementations, this is achieved by learning in software or using hardware-controlled learning using the following operations:

The ring ports are treated as pair when it comes to MAC learning in the ring;

When learning a new source MAC address seen on one of the ring ports, the L2 lookup table will be programmed with source MAC (along with other parameters like VLAN, source port as the key for lookup), but the L2 destination/forwarding lookup result will be made to point both the ring ports. This is one of the key changes that can help in replicating the packets on both sides of the ring when the node is the origin of the packet. The replication happens only in source ring node and not in transit ring nodes as explained below; and When learning a new source MAC address seen on non-ring ports, the L2 lookup table will be programmed with source MAC along with other parameters like VLAN, source port as the key for lookup, etc., but the L2 destination/forwarding lookup result will be made to point to the actual port where the MAC is learned. This can allow for learning of MAC to be updated to L2 tables.

Based on this approach of learning, there are several cases of traffic flow and how it will work in ring:

Traffic from non-ring port to ring port: Since destination is one of the ring ports, as per above logic, the destination is changed to point to both ring ports. In this case packets gets sent out on both ring ports. This is the case where replication occurs using the simple flooding logic in the switch but selectively.

Traffic from one ring port to another ring port: Since MAC addresses learned on one of the ring ports is made to point to both the ring ports, the destination lookup for this case will point to forward to both a first ring port and a second ring port. However, since the source is one of the ring ports, a Déjà vu check can be performed where the packets are skipped from begin sent to a same port where they came in. In this case the packets are normally forwarded from one ring port to another. There is no replication in this case.

Traffic from ring port to non-ring port: Since the destination is one of the non-ring ports, the lookup result is pointing to the actual non-ring port. Accordingly, the packet goes from ring port to non-ring port. There is no replication in this case.

Figure 4:
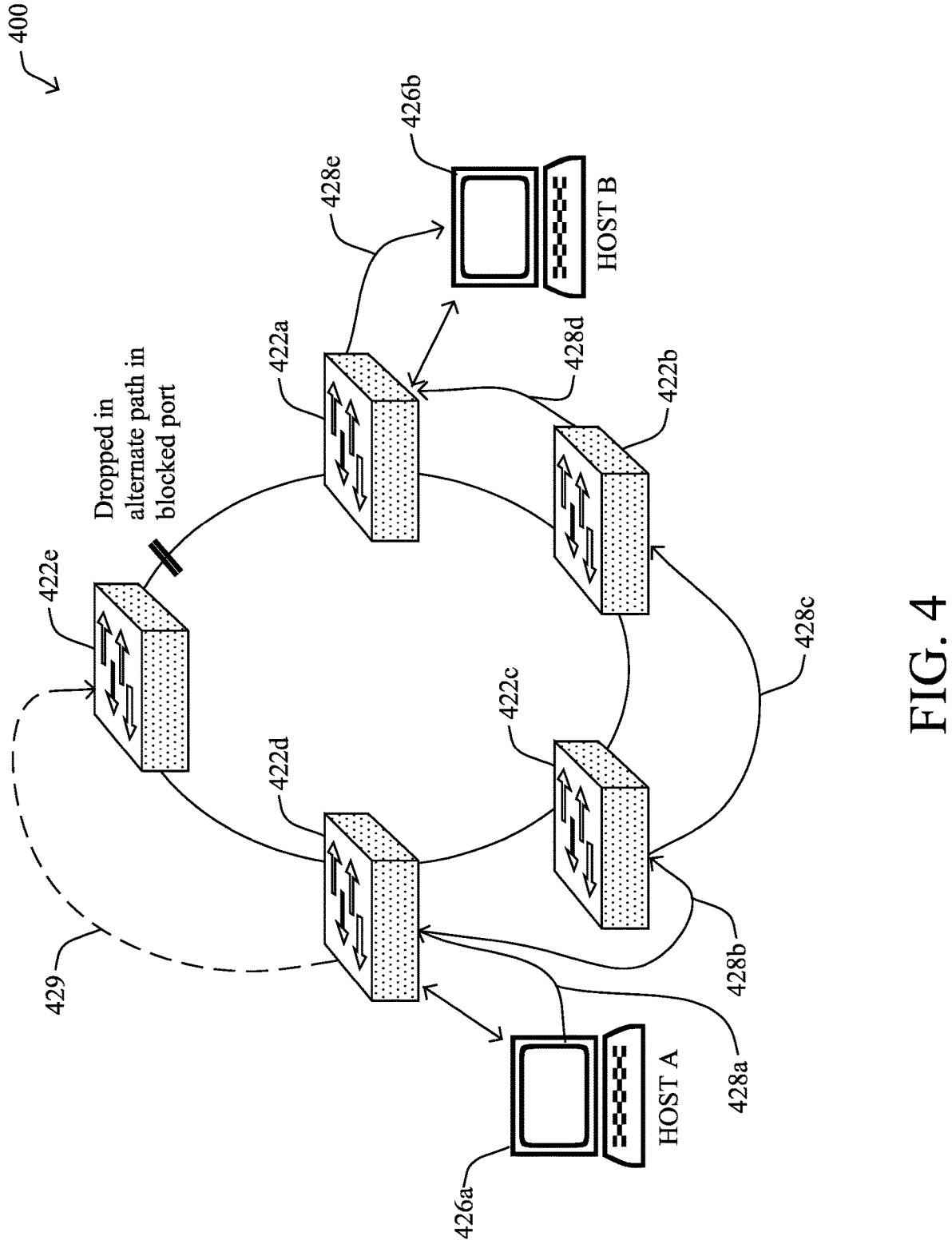
FIG. 4 illustrates an example system for fast recovery in layer 2 rings using selective replication.

FIG. 4 illustrates an example system for fast recovery in layer 2 rings using selective replication. As shown in FIG. 4, the ethernet ring 400 includes a plurality of ring nodes, such as a first ring node 422a, a second ring node 422b, a third ring node 422c, a fourth ring node 422d, and a fifth ring node 422e. Although not explicitly shown in FIG. 4, one of the plurality of ring nodes can be designated as the ring controller, such as the ring controller 320 of FIG. 3). In addition, the ethernet ring 400 is coupled to a first host 426a and a second host 426b. More specifically, the first host 426a is coupled to the fourth ring node 422d and the second host 426b is coupled to the first ring node 422a, although implementations are not limited to this particular configuration.

The non-limiting example of FIG. 4 illustrates how the traffic from the first host 426a is replicated in the ring node to which it is connected (e.g., the fourth ring node 422d). The arrows show the actual path the traffic takes from the first host 426a to the second host 426b. That is, the path the traffic takes is as follows: traffic from the first host 426a is directed to the fourth ring node 422d as indicated by the first arrow 428a; traffic from the fourth ring node 422d is directed to the third ring node 422c as indicated by the second arrow 428b; traffic from the third ring node 422c is directed to the second ring node 422b as indicated by the third arrow 428c; traffic from the second ring node 422b is directed to the first ring node 422a as indicated by the fourth arrow 428d; and traffic from the first ring node 422a is directed to the second host 426b as indicated by the fifth arrow 428e. The other replicated path, indicated by the line 429 gets dropped in the blocked port of the fifth ring node 422e.

In the non-limiting example of FIG. 4, the only case replication occurs is in source node in the ring where the hosts are connected (e.g., the fifth ring node 422e). In the transit ring nodes (e.g., the first, second, third, and fourth ring nodes), there is no replication, and the switch passes traffic from one ring port to another. Once the packet reaches the actual destination switch it directly goes to the non-ring port where hosts are connected. That is, the replicated packets get sent on both sides of ring from source node, but only one path has connection to the destination. The packet in other path will get dropped in the blocked port in the ring. This mechanism allows for replication using the simple selective flood logic in L2 tables and is able to discard the duplicate packet sent in the ring using the blocked port in the ring. Although this mechanism adds double the traffic in ring similar to redundancy protocols like HSR, these techniques provide for faster convergence without need for additional complexity to handle redundancy logic in hardware, ASICs, and/or FPGAs.

Further, implementations of the disclosure provide for selective replication where step three and step four described above are not required for the convergence of the ring when a failure is detected in the ring. Because traffic from the source node (e.g., the fourth ring node 422d in this non-limiting example) is sent along both sides of the ring, as soon as blocked port is moved to forwarding in step two, traffic black-holing stops and the traffic can reach the destination through the alternate path.

Step three and step four are optional and came be performed, however, traffic loss would be avoided for link failure detection and opening the blocked port by the controller (step one and step two). As mentioned above, implementations of the disclosure can be done in constant time (e.g., periodically using, for example, a beacon) irrespective of switching hardware. Opening the blocked port by the controller is typically a one bit write for a specific ring port and it can be done right after the link failure detection by the controller. In these implementations, the convergence in the L2 rings is just a constant function of time taken detect the link failure in the ring.

In some implementations, there is merit in having a chosen controller in this approach for convergence with selective replication. In scenarios in which there is chosen controller (e.g., a ring controller 320), the beacons are sent from the controller back to the controller and the blocked port is also present in the same chosen controller. This approach can reduce the traffic convergence time as a function of link failure detection using a beacon alone. That is, in some implementations with a chosen controller, the node that detects the failure is the controller itself and it may not be the node that holds the blocked port. Once the beacon failure is detected, the MCU that runs the beacon can flip the blocked port to forwarding state in constant time, as mentioned above. The time taken for convergence is only the time for three beacon losses, so if beacons can be sent with a frequency of four-hundred nanoseconds, the convergence can be achieved in one point two milliseconds. Accordingly, the chosen controller can be added as an extension to any ring protocols when this selective replication mode is enabled and can be added to protocols like REP. Further, with such a convergence time, even DLR can be supported.

As will be appreciated, the transition from a blocked state to a forwarding state is not thirty seconds using implementations of the disclosure (in contrast to some previous approaches). For example, although the chosen controller may play a role where a single port is changed from a blocked state to a forwarding state in the context where beacon loss is detected, there is no need for MAC flush as the selective replication takes care of packet forwarding along both sides of ring. Therefore, convergence in accordance with the disclosure may be dependent only on the beacon interval and the time taken to detect the loss of beacons (e.g., a three beacon loss).

As mentioned above, HSR adds additional cost and complexity for support through ASIC or FPGA. If HSR is supported in ASIC it adds increases the cost of ASIC and impacts the cost of every unit (even where it is not added) made with the same ASIC. If HSR is added with FPGA support, it adds additional cost for the specific unit(s) to which this functionality is added significantly and can only support limited instances of HSR. Also, if HSR is employed, there is an additional six byte HSR header added to each packet in the HSR ring. This creates additional overhead in terms of hardware logic to duplicate the packet, add the HSR header and, in the reverse, detect duplicate, and duplicate discard algorithms generally need to be supported in hardware. Accordingly, the hardware has to maintain additional tables in FPGA/ASIC like node tables and/or proxy node tables, which are limited in size and can only support limited number of HSR instances.

Moreover, HSR also adds complexities in nodes where they need to be dually attached (DANH) and support HSR header insertion, packet replication and handle duplicate discard algorithm. For single attached nodes, the complexity has to be added into an attached network element. In contrast, implementations herein provide a constant time convergence without any of this complexity in the end nodes or the network element. As a result, implementations described herein extend the standing MAC learning and flood support available in standard switching ASICs and provides constant time convergence as a function of link failure detection alone.

FIG. 5 illustrates an example procedure 500 for fast recovery in layer 2 rings using selective replication in accordance with the present disclosure. For example, a non-generic, specifically configured device (e.g., device 200) may perform procedure 500 by executing stored instructions (e.g., selective replication process 248). The procedure 500 may start at step 505, and continues to step 510, where, as described in greater detail above, a ring node of a network ring configures a lookup table of the ring node to point to both a first ring port and a second ring port of the ring node for remote addresses learned on either the first ring port or the second ring port. In some implementations, the network ring can comprise a layer 2 ring network.

The procedure 500 may continue to step 515 where, as described in greater detail above, the ring node configures the lookup table to point to a corresponding non-ring port of the ring node for local addresses learned on that corresponding non-ring port.

The procedure 500 may continue to step 520 where, as described in greater detail above, the ring node receives a packet having a destination address. In some implementations, the packet can be an Internet of Things (IoT) packet.

The procedure 500 may continue to step 525 where, as described in greater detail above, the ring node sends the packet toward the destination address according to the lookup table, thereby replicating the packet, when received on a non-ring port of the ring node and destined to a remote address, onto both the first ring port and the second ring port.

In some implementations, the packet may be received on one of the first ring port or the second ring port and is destined to a remote address. In these implementations, sending the packet can include transiting the packet to another of the first ring port or the second ring port according to the lookup table. As mentioned above, the packet may be prevented from being sent out a same port that received the packet despite the lookup table. Implementations are not so limited, however, and in some implementations, the packet may be received on one of the first ring port or the second ring port and is destined to a local address sending the packet can include passing the packet only onto an appropriate non-ring port of the ring node.

The procedure 500 may further include detecting a link failure in the network ring and refraining from communicating the link failure to switches associated with the network ring. Implementations are not so limited, however, and in some implementations, the procedure 500 may further include detecting a link failure in the network ring and refraining from purging one or more of the remote addresses learned on either the first ring port or the second ring port in response to the link failure. As mentioned above, link failure in the network ring can be detected based on a beacon interval sent across the network ring. Further, as discussed above, the procedure 500 provides, to the network ring, a convergence time of less than ten milliseconds when a link failure is detected in the network ring.

In some implementations, the procedure 500 can include receiving a transit packet on one of the first ring port or the second ring port and sending the transit packet to another of the first ring port or the second ring port. In some such implementations, the transit packet can be sent according to the lookup table and thereby replicated, and the packets can be prevented from going back out a same port that received the packets. In yet other implementations, the transit packet can be received on one of the first ring port or the second ring port and can be sent to a local address only onto an appropriate non-ring port. As discussed above, the procedure 500 can include providing, to the network ring, a convergence time of less than ten milliseconds when a link failure is detected in the network ring. For example, a convergence time of three milliseconds, five milliseconds, etc. can be provided to the network ring in accordance with the disclosure.

The procedure 500 may further include detecting a link failure in the network ring and sending the packet toward the destination address according to the lookup table and responsive to detecting the link failure. In some implementations, the procedure 500 can include detecting the link failure in the network ring periodically as a function of a beacon interval sent across the network ring.

As discussed above, the procedure 500 can include refraining from communicating a failure to switches associated with the network ring. In addition to, or in the alternative, the procedure 500 can include refraining from purging the remote addresses learned on either the first ring port or the second ring port when the destination address is associated with either the first ring port or the second ring port.

The procedure 500 may end at step 530.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the implementations herein. Moreover, while procedures may have been described separately, certain steps from each procedure may be incorporated into each other, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: configure a lookup table of the ring node to point to both a first ring port and a second ring port of the ring node for remote addresses learned on either the first ring port or the second ring port; configure the lookup table to point to a corresponding non-ring port of the ring node for local addresses learned on that corresponding non-ring port; receive a packet having a destination address; and send the packet toward the destination address according to the lookup table, thereby replicating the packet, when received on a non-ring port of the ring node and destined to a remote address, onto both the first ring port and the second ring port.

In still other implementations, a tangible, non-transitory, computer-readable medium storing program instructions that cause a device to execute a process comprising: configuring, at a ring node of a network ring, a lookup table of the ring node to point to both a first ring port and a second ring port of the ring node for remote addresses learned on either the first ring port or the second ring port; configuring, at the ring node, the lookup table to point to a corresponding non-ring port of the ring node for local addresses learned on that corresponding non-ring port; receiving, at the ring node, a packet having a destination address; and sending, by the ring node, the packet toward the destination address according to the lookup table, thereby replicating the packet, when received on a non-ring port of the ring node and destined to a remote address, onto both the first ring port and the second ring port.

The techniques described herein, therefore, utilize standard switching functionality of switching ASICs (e.g., internal and external switching ASICs used in industrial switches) to improve convergence time (e.g., to provide convergence times that are lower than ten milliseconds such as five milliseconds or three milliseconds) without the need for additional ASICs and/or hardware relied on by other approaches.

Illustratively, the techniques described herein may be performed by hardware, software, and/or firmware, (e.g., an "apparatus") such as in accordance with the selective replication process (e.g., the selective replication process 248), and may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., selective replication process 248).

While there have been shown and described illustrative implementations above, it is to be understood that various other adaptations and modifications may be made within the intent and scope of the implementations herein. For example, while certain architectures, schemes, workloads, etc., are shown herein, the embodiments herein are not so limited.

Further, it is to be understood that various other adaptations and modifications may be made within the scope of the implementations herein. For example, while certain implementations are described herein with respect to certain types of computing architectures in particular, the techniques are not limited as such and may be used with any computing architecture, generally, in other implementations. In addition, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:
   configuring, at a ring node of a network ring, a lookup table of the ring node to point to both a first ring port and a second ring port of the ring node for remote addresses learned on either the first ring port or the second ring port;
   configuring, at the ring node, the lookup table to point to a corresponding non-ring port of the ring node for local addresses learned on that corresponding non-ring port;
   receiving, at the ring node, a packet having a destination address; and
   sending, by the ring node, the packet toward the destination address according to the lookup table, thereby replicating the packet, when received on a non-ring port of the ring node and destined to a remote address, onto both the first ring port and the second ring port.

2. The method of claim 1, wherein the packet is received on one of the first ring port or the second ring port and is destined to a remote address, and wherein sending comprises:
   transiting the packet to another of the first ring port or the second ring port according to the lookup table.

3. The method of claim 2, wherein the packet is prevented from being sent out a same port that received the packet despite the lookup table.

4. The method of claim 1, wherein the packet is received on one of the first ring port or the second ring port and is destined to a local address, and wherein sending comprises:
   passing the packet only onto an appropriate non-ring port of the ring node.

5. The method of claim 1, further comprising:
   detecting a link failure in the network ring; and
   refraining from communicating the link failure to switches associated with the network ring.

6. The method of claim 1, further comprising:
   detecting a link failure in the network ring; and
   refraining from purging one or more of the remote addresses learned on either the first ring port or the second ring port in response to the link failure.

7. The method of claim 1, further comprising:
   detecting a link failure in the network ring based on a beacon interval sent across the network ring.

8. The method of claim 1, further comprising:
   providing, to the network ring, a convergence time of less than ten milliseconds when a link failure is detected in the network ring.

9. The method of claim 1, wherein the network ring comprises a layer 2 ring network.

10. The method of claim 1, wherein the packet is an Internet of Things (IoT) packet.

11. An apparatus, comprising:
   one or more network interfaces to communicate with a network as a ring node of a network ring;

a processor coupled to the one or more network interfaces and configured to execute one or more processes; and a memory configured to store a process that is executable by the processor, the process, when executed, configured to:

configure a lookup table of the ring node to point to both a first ring port and a second ring port of the ring node for remote addresses learned on either the first ring port or the second ring port;

configure the lookup table to point to a corresponding non-ring port of the ring node for local addresses learned on that corresponding non-ring port;

receive a packet having a destination address; and send the packet toward the destination address according to the lookup table, thereby replicating the packet, when received on a non-ring port of the ring node and destined to a remote address, onto both the first ring port and the second ring port.

12. The apparatus of claim 11, wherein the packet is received on one of the first ring port or the second ring port and is destined to a remote address, and wherein the process is configured to send the packet by transiting the packet to another of the first ring port or the second ring port according to the lookup table.

13. The apparatus of claim 12, wherein the packet is prevented from being sent out a same port that received the packet despite the lookup table.

14. The apparatus of claim 11, wherein the packet is received on one of the first ring port or the second ring port and is destined to a local address, and wherein the process is configured to send the packet by passing the packet only onto an appropriate non-ring port of the ring node.

15. The apparatus of claim 11, wherein the process, when executed, is configured to:

detect a link failure in the network ring; and refrain from communicating the link failure to switches associated with a network ring.

16. The apparatus of claim 11, wherein the process, when executed, is configured to:

detect a link failure in the network ring; and refrain from purging one or more of the remote addresses learned on either the first ring port or the second ring port in response to the link failure.

17. The apparatus of claim 11, wherein the process, when executed, is configured to:

detect a link failure in a network ring based on a beacon interval sent across the network ring.

18. The apparatus of claim 11, wherein the process, when executed, is configured to:

provide a convergence time of less than five milliseconds when a link failure is detected in a network ring.

19. The apparatus of claim 11, wherein the network ring comprises a layer 2 ring network.

20. A tangible, non-transitory, computer-readable medium storing program instructions that cause a device to execute a process comprising:

configuring, at a ring node of a network ring, a lookup table of the ring node to point to both a first ring port and a second ring port of the ring node for remote addresses learned on either the first ring port or the second ring port;

configuring, at the ring node, the lookup table to point to a corresponding non-ring port of the ring node for local addresses learned on that corresponding non-ring port;

receiving, at the ring node, a packet having a destination address; and sending, by the ring node, the packet toward the destination address according to the lookup table, thereby replicating the packet, when received on a non-ring port of the ring node and destined to a remote address, onto both the first ring port and the second ring port.

* * * * *